US010290307B2

(12) United States Patent
Chordia et al.

(10) Patent No.: US 10,290,307 B2
(45) Date of Patent: May 14, 2019

(54) AUTOMATIC CONVERSION OF SPEECH INTO SONG, RAP OR OTHER AUDIBLE EXPRESSION HAVING TARGET METER OR RHYTHM

(71) Applicant: SMULE, INC., San Francisco, CA (US)

(72) Inventors: Parag Chordia, Los Altos Hills, CA (US); Mark Godfrey, Atlanta, GA (US); Alexander Rae, Atlanta, GA (US); Prerna Gupta, Los Altos Hills, CA (US); Perry R. Cook, Jacksonville, OR (US)

(73) Assignee: SMULE, INC., San Francisco, CA (US)

( * ) Notice: Subject to any disclaimer, the term of this patent is extended or adjusted under 35 U.S.C. 154(b) by 0 days.

(21) Appl. No.: 15/606,111

(22) Filed: May 26, 2017

(65) Prior Publication Data

US 2017/0337927 A1 Nov. 23, 2017

Related U.S. Application Data

(63) Continuation of application No. 13/910,949, filed on Jun. 5, 2013, now Pat. No. 9,666,199, which is a (Continued)

(51) Int. Cl.
*G10L 21/055* (2013.01)
*G01L 21/04* (2006.01)
(Continued)

(52) U.S. Cl.
CPC ............. *G10L 19/02* (2013.01); *G10H 1/366* (2013.01); *G10L 19/00* (2013.01); *G10L 21/055* (2013.01);
(Continued)

(58) Field of Classification Search
CPC ... G10L 13/033; G10L 13/0335; G10L 15/04; G10L 21/01; G10L 21/013;
(Continued)

(56) References Cited

U.S. PATENT DOCUMENTS 3,651,241 A 3/1972 Kakehashi
3,840,691 A 10/1974 Okamoto
(Continued)

FOREIGN PATENT DOCUMENTS

CN 101399036 A 4/2009
JP 2000-105595 4/2000
(Continued)

OTHER PUBLICATIONS

Oytun Turk et al.; "Application of Voice Conversion for Cross-Language Rap Singing Transformation", Acoutics, Speech and Signal Processing Conference Proceedings, 2009, ICASSP 2009, IEEE International Conference, IEEE, Piscataway, NJ, USA, Apr. 19, 2009, pp. 3597-3600.

(Continued)

*Primary Examiner* — Martin Lerner
(74) *Attorney, Agent, or Firm* — Haynes and Boone, LLP

(57) ABSTRACT

Captured vocals may be automatically transformed using advanced digital signal processing techniques that provide captivating applications, and even purpose-built devices, in which mere novice user-musicians may generate, audibly render and share musical performances. In some cases, the automated transformations allow spoken vocals to be segmented, arranged, temporally aligned with a target rhythm, meter or accompanying backing tracks and pitch corrected in accord with a score or note sequence. Speech-to-song music applications are one such example. In some cases, spoken vocals may be transformed in accord with musical genres such as rap using automated segmentation and tem-
(Continued)

poral alignment techniques, often without pitch correction. Such applications, which may employ different signal processing and different automated transformations, may nonetheless be understood as speech-to-rap variations on the theme.

20 Claims, 10 Drawing Sheets

Related U.S. Application Data continuation of application No. 13/853,759, filed on Mar. 29, 2013, now Pat. No. 9,324,330, which is a continuation of application No. PCT/US2013/034678, filed on Mar. 29, 2013.

(60) Provisional application No. 61/617,643, filed on Mar. 29, 2012, provisional application No. 61/617,643, filed on Mar. 29, 2012.

(51) Int. Cl.
*G10L 19/02* (2013.01)
*G10L 19/00* (2013.01)
*G10H 1/36* (2006.01)

(52) U.S. Cl.
CPC . *G10H 2210/051* (2013.01); *G10H 2240/141* (2013.01); *G10H 2250/235* (2013.01)

(58) Field of Classification Search
CPC ............. G10L 2021/0135; G10L 21/04; G10L 21/047; G10L 21/055; G10L 21/057; G10H 1/366; G10H 2210/051
USPC .......... 704/207, 211, 241, 270, 278; 84/635, 84/713
See application file for complete search history.

(56) References Cited

U.S. PATENT DOCUMENTS 5,749,064 A 5/1998 Pawate
5,828,994 A * 10/1998 Covell .................... G10L 21/04 704/211
5,842,172 A 11/1998 Wilson
6,001,131 A * 12/1999 Raman ................ G10L 21/0208 704/226
6,075,193 A 6/2000 Aoki
6,281,421 B1 8/2001 Kawaguchi
6,535,851 B1 * 3/2003 Fanty ...................... G10L 15/04 704/245
6,570,991 B1 5/2003 Scheirer et al.
6,703,549 B1 3/2004 Nishimoto
6,838,608 B2 1/2005 Koike
7,792,669 B2 9/2010 Oh et al.
7,825,321 B2 11/2010 Bloom et al.
7,858,867 B2 12/2010 Sherwani
8,386,256 B2 2/2013 Raitio et al.
8,415,549 B2 4/2013 Adam
8,686,276 B1 4/2014 Salazar
8,868,411 B2 10/2014 Cook
8,946,534 B2 2/2015 Kakishita
9,058,797 B2 6/2015 Salazar
9,147,385 B2 9/2015 Salazar
9,324,330 B2 4/2016 Chordia
9,666,199 B2 * 5/2017 Chordia .................. G10L 19/00
2002/0017188 A1 2/2002 Aoki
2003/0033140 A1 2/2003 Taori
2004/0172240 A1 9/2004 Crockett et al.
2005/0025263 A1 2/2005 Wu
2005/0187761 A1 8/2005 Shi et al.
2006/0080100 A1 * 4/2006 Pinxteren ................ G10L 25/48 704/249
2006/0165240 A1 * 7/2006 Bloom ................... G10H 1/366 381/56
2008/0209484 A1 * 8/2008 Xu .......................... G10L 25/48 725/105
2009/0173217 A1 7/2009 Kim
2009/0288546 A1 * 11/2009 Takeda .................... G10L 25/48 84/612
2009/0313016 A1 * 12/2009 Cevik ..................... G10L 15/22 704/241
2010/0095829 A1 4/2010 Edwards
2010/0169105 A1 7/2010 Shim
2010/0257994 A1 10/2010 Hufford
2011/0010321 A1 1/2011 Pachet
2011/0099021 A1 4/2011 Zong
2011/0144983 A1 6/2011 Salazar
2012/0125179 A1 5/2012 Kobayashi
2012/0143600 A1 * 6/2012 Iriyama ................... G10L 13/08 704/207
2013/0144626 A1 6/2013 Shau
2014/0229831 A1 8/2014 Chordia

FOREIGN PATENT DOCUMENTS

JP 2006-48377 2/2006
JP 2011-048335 3/2011

OTHER PUBLICATIONS

M. Slaney et al.; "Automatic Audio Morphing", 1996 IEEE International Conference on Acoutics, Speech, and Signal Processing Conference Proceedings, vol. 2, Jan. 1, 1996, pp. 1001-1004.
PCT International Search Report issued in PCT/US2013/034678 dated Aug. 30, 2013, 5 pages.
JP Notice of Rejection Ground issued in JP Application No. 2015-503661 dated Jun. 6, 2017, 4 pages.
Keijiro Saino, "Rap-style Singing Voice Synthesis", 2011 IPSJ SIG technical report, Apr. 15, 2012, pp. 1-6.

* cited by examiner

AUTOMATIC CONVERSION OF SPEECH INTO SONG, RAP OR OTHER AUDIBLE EXPRESSION HAVING TARGET METER OR RHYTHM

CROSS-REFERENCE TO RELATED APPLICATIONS

This present application is a continuation of U.S. application Ser. No. 13/910,949, filed Jun. 5, 2013, now U.S. Pat. No. 9,666,199 issued May 30, 2017, which is a continuation of U.S. application Ser. No. 13/853,759, filed Mar. 29, 2013 now U.S. Pat. No. 9,324,330, which claims priority to U.S. Provisional Application No. 61/617,643, filed Mar. 29, 2012. U.S. application Ser. No. 13/910,949 filed Jun. 5, 2013 is also a continuation of International Application No. PCT/US2013/034678, filed Mar. 29, 2013, which claims priority to U.S. Provisional Application No. 61/617,643, filed Mar. 29, 2012. Each of the foregoing applications is incorporated by reference herein.

BACKGROUND

Field of the Invention

The present invention relates generally to computational techniques including digital signal processing for automated processing of speech and, in particular, to techniques whereby a system or device may be programmed to automatically transform an input audio encoding of speech into an output encoding of song, rap or other expressive genre having meter or rhythm for audible rendering.

Description of the Related Art

The installed base of mobile phones and other handheld compute devices grows in sheer number and computational power each day. Hyper-ubiquitous and deeply entrenched in the lifestyles of people around the world, they transcend nearly every cultural and economic barrier. Computationally, the mobile phones of today offer speed and storage capabilities comparable to desktop computers from less than ten years ago, rendering them surprisingly suitable for real-time sound synthesis and other digital signal processing based transformations of audiovisual signals.

Indeed, modern mobile phones and handheld compute devices, including iOS™ devices such as the iPhone™, iPod Touch™ and iPad™ digital devices available from Apple Inc. as well as competitive devices that run the Android operating system, all tend to support audio and video playback and processing quite capably. These capabilities (including processor, memory and I/O facilities suitable for real-time digital signal processing, hardware and software CODECs, audiovisual APIs, etc.) have contributed to vibrant application and developer ecosystems. Examples in the music application space include the popular I Am T-Pain and Glee Karaoke social music apps available from Smule, Inc., which provide real-time continuous pitch correction of captured vocals, and the LaDiDa reverse karaoke app from Khush, Inc. which automatically composes music to accompany user vocals.

SUMMARY

It has been discovered that captured vocals may be automatically transformed using advanced digital signal processing techniques that provide captivating applications, and even purpose-built devices, in which mere novice user-musicians may generate, audibly render and share musical performances. In some cases, the automated transformations allow spoken vocals to be segmented, arranged, temporally aligned with a target rhythm, meter or accompanying backing tracks and pitch corrected in accord with a score or note sequence. Speech-to-song music applications are one such example. In some cases, spoken vocals may be transformed in accord with musical genres such as rap using automated segmentation and temporal alignment techniques, often without pitch correction. Such applications, which may employ different signal processing and different automated transformations, may nonetheless be understood as speech-to-rap variations on the theme.

In speech-to-song and speech-to-rap applications (or purpose-built devices such as for toy or amusement markets), an automatic transformation of captured vocals is typically shaped by features (e.g., rhythm, meter, repeat/reprise organization) of a backing musical track with which the transformed vocals are eventually mixed for audible rendering. On the other hand, while mixing with a musical backing track is typical in many implementations of the invented techniques, in some cases, automated transforms of captured vocals may be adapted to provide expressive performances that are temporally aligned with a target rhythm or meter (such as a poem, iambic cycle, limerick, etc.) without musical accompaniment. These and other variations will be understood by persons of ordinary skill in the art who have access to the present disclosure and with reference to the claims that follow.

In some embodiments in accordance with the present invention, a computational method is implemented for transforming an input audio encoding of speech into an output that is rhythmically consistent with a target song. The method includes (i) segmenting the input audio encoding of the speech into plural segments, the segments corresponding to successive sequences of samples of the audio encoding and delimited by onsets identified therein; (ii) temporally aligning successive, time-ordered ones of the segments with respective successive pulses of a rhythmic skeleton for the target song; (iii) temporally stretching at least some of the temporally aligned segments and temporally compressing at least some other ones of the temporally aligned segments, the temporal stretching and compressing substantially filling available temporal space between respective ones of the successive pulses of the rhythmic skeleton, wherein the temporal stretching and compressing is performed substantially without pitch shifting the temporally aligned segments; and (iv) preparing a resultant audio encoding of the speech in correspondence with the temporally aligned, stretched and compressed segments of the input audio encoding.

In some embodiments, the method further includes mixing the resultant audio encoding with an audio encoding of a backing track for the target song and audibly rendering the mixed audio. In some embodiments, the method further includes capturing (from a microphone input of a portable handheld device) speech voiced by a user thereof as the input audio encoding.

In some embodiments, the method further includes retrieving (responsive to a selection of the target song by the user) a computer readable encoding of at least one of the rhythmic skeleton and a backing track for the target song. In some cases, the retrieving responsive to user selection includes obtaining, from a remote store and via a communication interface of the portable handheld device, either or both of the rhythmic skeleton and the backing track.

In some cases or embodiments, the segmenting includes: (i) applying a band-limited or band-weighted spectral difference type (SDF-type) function to the audio encoding of the speech and picking temporally indexed peaks in a result thereof as onset candidates within the speech encoding; and (ii) agglomerating adjacent onset candidate-delimited subportions of the speech encoding into segments based, at least in part, on comparative strength of onset candidates. In some cases, the band-limited or band-weighted SDF-type function operates on a psychoacoustically-based representation of power spectrum for the speech encoding, and the band limitation or weighting emphasizes a sub-band of the power spectrum below about 2000 Hz. In some cases, the emphasized sub-band is from approximately 700 Hz to approximately 1500 Hz. In some cases, the agglomerating is performed, at least in part, based on a minimum segment length threshold.

In some cases, the rhythmic skeleton corresponds to a pulse train encoding of tempo of the target song. In some cases, the target song includes plural constituent rhythms, and the pulse train encoding includes respective pulses scaled in accord with relative strengths of the constituent rhythms.

In some embodiments, the method further includes performing beat detection for a backing track of the target song to produce the rhythmic skeleton. In some embodiments, the method further includes performing the stretching and compressing substantially without pitch shifting using a phase vocoder. In some cases, stretching and compressing are performed in real-time at rates that vary for respective of the temporally aligned segments in accord with respective ratios of segment length to temporal space to be filled between successive pulses of the rhythmic skeleton.

In some embodiments, the method further includes, for at least some of the temporally aligned segments of the speech encoding, padding with silence to substantially fill available temporal space between respective ones of the successive pulses of the rhythmic skeleton. In some embodiments, the method further includes, for each of plural candidate mappings of the sequentially-ordered segments to the rhythmic skeleton, evaluating a statistical distribution of temporal stretching and compressing ratios applied to respective ones of the sequentially-ordered segments, and selecting from amongst the candidate mappings at least in part based on the respective statistical distributions.

In some embodiments, the method further includes, for each of plural candidate mappings of the sequentially-ordered segments to the rhythmic skeleton wherein the candidate mappings have differing start points, computing for the particular candidate mapping a magnitude of the temporal stretching and compressing; and selecting from amongst the candidate mappings at least in part based on the respective computed magnitudes. In some cases, the respective magnitudes are computed as a geometric mean of the stretch and compression ratios, and the selection is of a candidate mapping that substantially minimizes the computed geometric mean.

In some embodiments, any of the foregoing methods are performed on a portable computing device selected from the group of a compute pad, a personal digital assistant or book reader, and a mobile phone or media player. In some embodiments, a computer program product is encoded in one or more media and includes instructions executable on a processor of a portable computing device to cause the portable computing device to perform any of the foregoing methods. In some cases or embodiments, the one or more media are non-transitory media readable by the portable computing device or readable incident to a computer program product conveying transmission to the portable computing device.

In some embodiments in accordance with the present invention, an apparatus includes a portable computing device and machine readable code embodied in a non-transitory medium and executable on the portable computing device to segment an input audio encoding of speech into segments that include successive onset-delimited sequences of samples of the audio encoding. The machine readable code is further executable to temporally align successive, time-ordered ones of the segments with respective successive pulses of a rhythmic skeleton for the target song. The machine readable code is further executable to temporally stretch at least some of the temporally aligned segments and to temporally compress at least some other ones of the temporally aligned segments, the temporal stretching and compressing substantially filling available temporal space between respective ones of the successive pulses of the rhythmic skeleton substantially without pitch shifting the temporally aligned segments. The machine readable code is still further executable to prepare a resultant audio encoding of the speech in correspondence with the temporally aligned, stretched and compressed segments of the input audio encoding. In some embodiments, the apparatus is embodied as one or more of a compute pad, a handheld mobile device, a mobile phone, a personal digital assistant, a smart phone, a media player and a book reader.

In some embodiments, a computer program product is encoded in non-transitory media and includes instructions executable on a computational system to transform an input audio encoding of speech into an output that is rhythmically consistent with a target song, the computer program product encoding and comprising: (i) instructions executable to segment the input audio encoding of the speech into plural segments that correspond to successive onset-delimited sequences of samples from the audio encoding; (ii) instructions executable to temporally align successive, time-ordered ones of the segments with respective successive pulses of a rhythmic skeleton for the target song; (iii) instructions executable to temporally stretch at least some of the temporally aligned segments and to temporally compress at least some other ones of the temporally aligned segments, the temporal stretching and compressing substantially filling available temporal space between respective ones of the successive pulses of the rhythmic skeleton substantially without pitch shifting the temporally aligned segments; and (iv) instructions executable to prepare a resultant audio encoding of the speech in correspondence with the temporally aligned, stretched and compressed segments of the input audio encoding. In some cases or embodiments, the media are non-transitory media readable by the portable computing device or readable incident to a computer program product conveying transmission to the portable computing device.

These and other embodiments, together with numerous variations thereon, will be appreciated by persons of ordinary skill in the art based on the description, claims and drawings that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

As described herein, automatic transformations of captured user vocals may provide captivating applications executable even on the handheld compute platforms that have become ubiquitous since the advent of iOS and Android-based phones, media devices and tablets. The automatic transformations may even be implemented in purpose-built devices, such as for the toy, gaming or amusement device markets.

Advanced digital signal processing techniques described herein allow implementations in which mere novice user-musicians may generate, audibly render and share musical performances. In some cases, the automated transformations allow spoken vocals to be segmented, arranged, temporally aligned with a target rhythm, meter or accompanying backing tracks and pitch corrected in accord with a score or note sequence. Speech-to-song music implementations are one such example and exemplary songification application is described below. In some cases, spoken vocals may be transformed in accord with musical genres such as rap using automated segmentation and temporal alignment techniques, often without pitch correction. Such applications, which may employ different signal processing and different automated transformations, may nonetheless be understood as speech-to-rap variations on the theme. Adaptations to provide an exemplary AutoRap application are also described herein.

In the interest of concreteness, processing and device capabilities, terminology, API frameworks and even form factors typical of a particular implementation environment, namely the iOS device space popularized by Apple, Inc. have been assumed. Notwithstanding descriptive reliance on any such examples or framework, persons of ordinary skill in the art having access to the present disclosure will appreciate deployments and suitable adaptations for other compute platforms and other concrete physical implementations.

Automated Speech to Music Transformation ("Songification")

Figure 1:
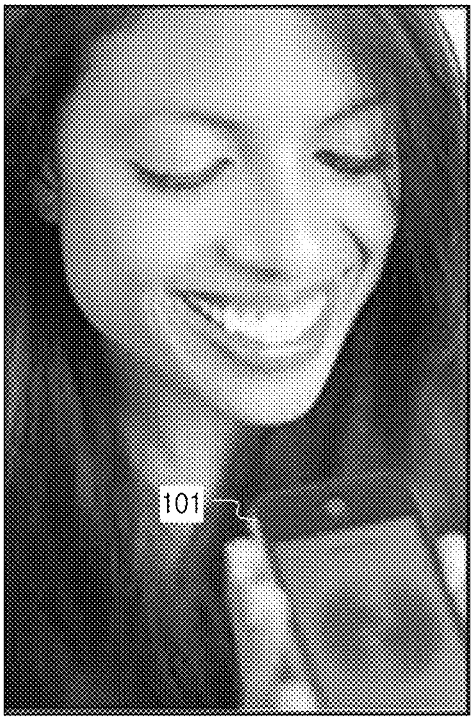
FIG. 1 is a visual depiction of a user speaking proximate to a microphone input of an illustrative handheld compute platform that has been programmed in accordance with some embodiments of the present invention(s) to automatically transform a sampled audio signal into song, rap or other expressive genre having meter or rhythm for audible rendering.
Figure 2:
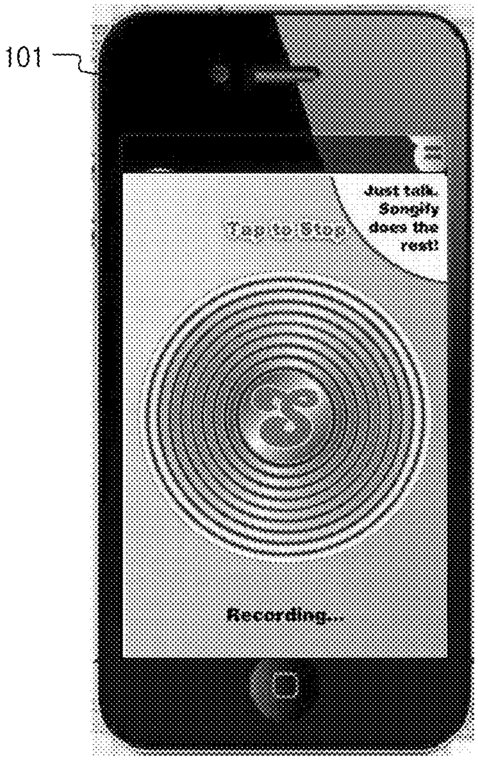
FIG. 2 is screen shot image of a programmed handheld compute platform (such as that depicted in FIG. 1) executing software to capture speech type vocals in preparation for automated transformation of a sampled audio signal in accordance with some embodiments of the present invention(s).

FIG. 1 is depiction of user speaking proximate to a microphone input of an illustrative handheld compute platform 101 that has been programmed in accordance with some embodiments of the present invention(s) to automatically transform a sampled audio signal into song, rap or other expressive genre having meter or rhythm for audible rendering. FIG. 2 is an illustrative capture screen image of programmed handheld compute platform 101 executing application software (e.g., a Songify application 350) to capture speech type vocals (e.g., from microphone input 314) in preparation for automated transformation of a sampled audio signal.

Figure 3:
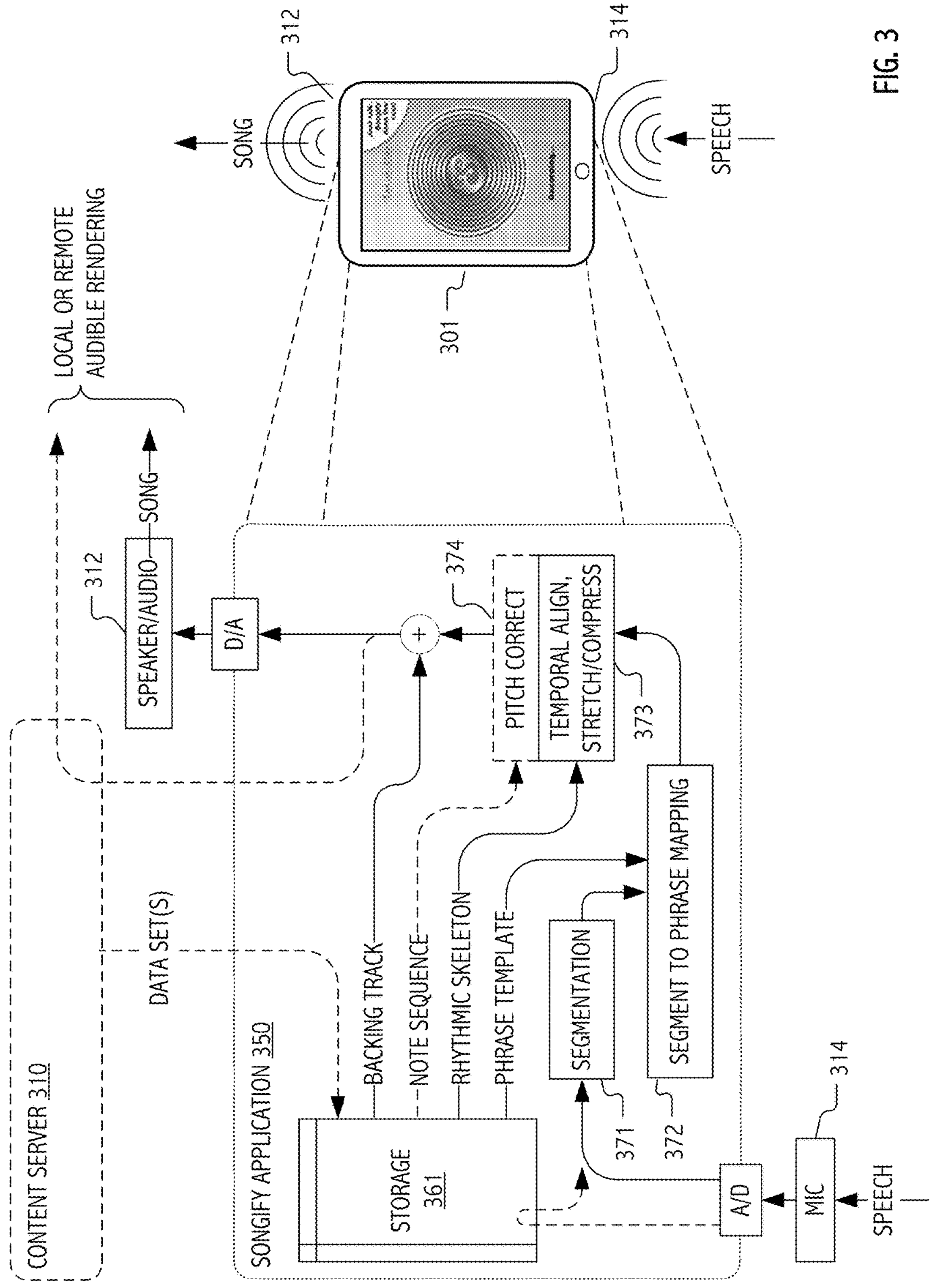
FIG. 3 is a functional block diagram illustrating data flows amongst functional blocks of in, or in connection with, an illustrative handheld compute platform embodiment of the present invention(s).

FIG. 3 is a functional block diagram illustrating data flows amongst functional blocks of, or in connection with, an illustrative iOS-type handheld 301 compute platform embodiment of the present invention(s) in which a Songify application 350 executes to automatically transform vocals captured using a microphone 314 (or similar interface) and is audibly rendered (e.g., via speaker 312 or coupled headphone). Data sets for particular musical targets (e.g., a backing track, phrase template, precomputed rhythmic skeleton, optional score and/or note sequences) may be downloaded into local storage 361 (e.g., demand supplied or as part of a software distribution or update) from a remote content server 310 or other service platform.

Figure 4:
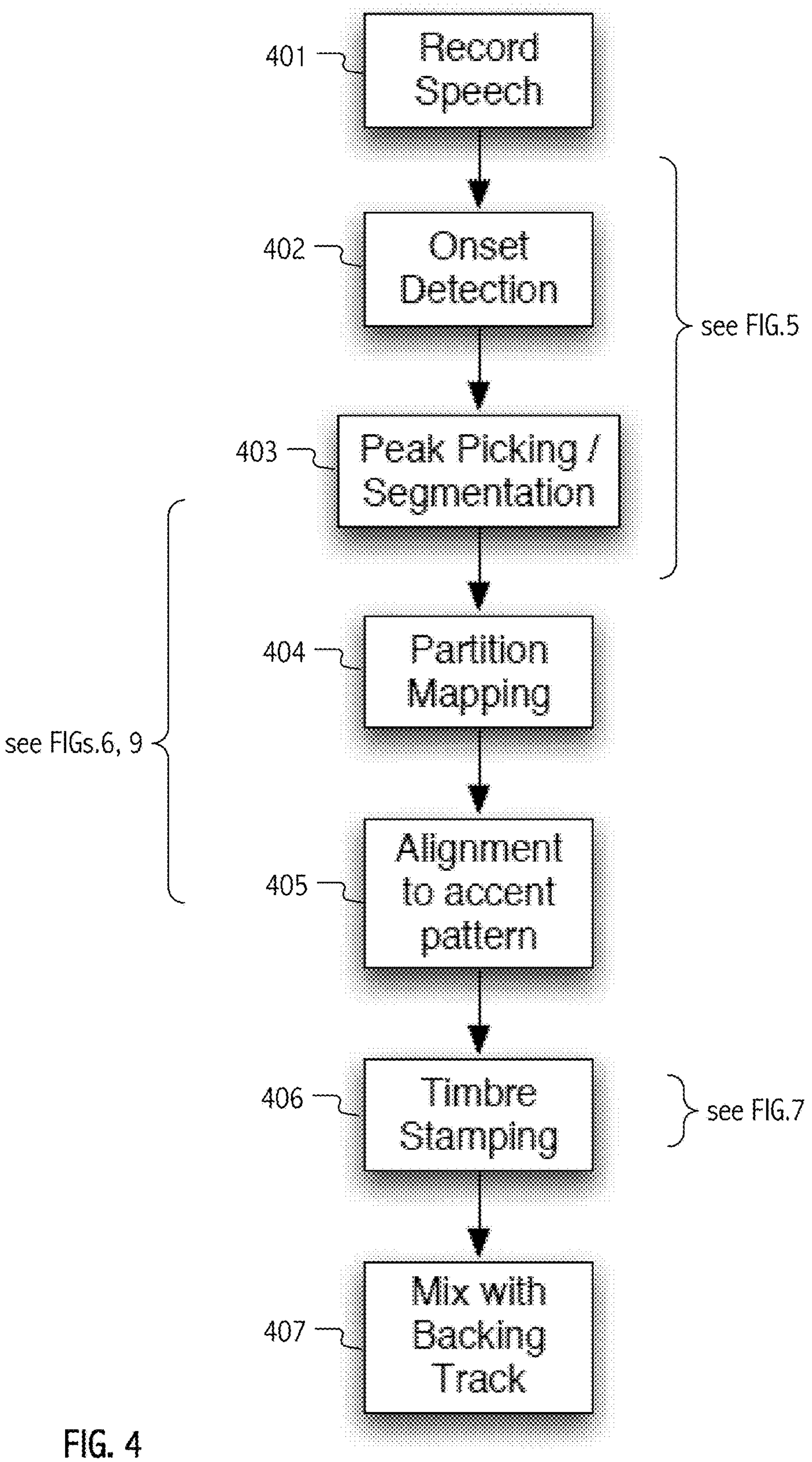
FIG. 4 is a flowchart illustrating a sequence of steps in an illustrative method whereby, in accordance with some embodiments of the present invention(s), a captured speech audio encoding is automatically transformed into an output song, rap or other expressive genre having meter or rhythm for audible rendering with a backing track.

Various illustrated functional blocks (e.g., audio signal segmentation 371, segment to phrase mapping 372, temporal alignment and stretch/compression 373 of segments, and pitch correction 374) will be understood, with reference to signal processing techniques detailed herein, to operate upon audio signal encodings derived from captured vocals and represented in memory or non-volatile storage on the compute platform. FIG. 4 is a flowchart illustrating a sequence of steps (401, 402, 403, 404, 405, 406 and 407) in an illustrative method whereby a captured speech audio encoding (e.g., that captured from microphone 314, recall FIG. 3), is automatically transformed into an output song, rap or other expressive genre having meter or rhythm for audible rendering with a backing track. Specifically, FIG. 4 summarizes a flow (e.g., through functional or computational blocks such as illustrated relative to Songify application 350 executing on the illustrative iOS-type handheld 301 compute platform, recall FIG. 3) that includes:

- capture or recording (401) of speech as an audio signal;
- detection (402) of onsets or onset candidates in the captured audio signal;
- picking from amongst the onsets or onset candidates peaks or other maxima so as to generate segmentation (403) boundaries that delimit audio signal segments;
- mapping (404) individual segments or groups of segments to ordered sub-phrases of a phrase template or other skeletal structure of a target song (e.g., as candidate phrases determined as part of a partitioning computation);
- evaluating rhythmic alignment (405) of candidate phrases to a rhythmic skeleton or other accent pattern/structure for the target song and (as appropriate) stretching/compressing to align voice onsets with note onsets and (in some cases) to fill note durations based on a melody score of the target song;
- using a vocoder or other filter re-synthesis-type timbre stamping (406) technique by which captured vocals (now phrase-mapped and rhythmically aligned) are shaped by features (e.g., rhythm, meter, repeat/reprise organization) of the target song; and
- eventually mixing (407) the resultant temporally aligned, phrase-mapped and timbre stamped audio signal with a backing track for the target song.

These and other aspects are described in greater detail below and illustrated relative to FIGS. 5-8.

Speech Segmentation

When lyrics are set to a melody, it is often the case that certain phrases are repeated to reinforce musical structure. Our speech segmentation algorithm attempts to determine boundaries between words and phrases in the speech input so that phrases can be repeated or otherwise rearranged. Because words are typically not separated by silence, simple silence detection may, as a practical matter, be insufficient in many applications. Exemplary techniques for segmentation of the captured speech audio signal will be understood with reference to FIG. 5 and the description that follows.

Sone Representation

The speech utterance is typically digitized as speech encoding 501 using a sample rate of 44100 Hz. A power spectrum is computed from the spectrogram. For each frame, an FFT is taken using a Hann window of size 1024 (with a 50% overlap). This returns a matrix, with rows representing frequency bins and columns representing time-steps. In order to take into account human loudness perception, the power spectrum is transformed into a sone-based representation. In some implementations, an initial step of this process involves a set of critical-band filters, or bark band filters 511, which model the auditory filters present in the inner ear. The filter width and response varies with frequency, transforming the linear frequency scale to a logarithmic one. Additionally, the resulting sone representation 502 takes into account the filtering qualities of the outer ear as well as modeling spectral masking. At the end of this process, a new matrix is returned with rows corresponding to critical bands and columns to time-steps.

Onset Detection

One approach to segmentation involves finding onsets. New events, such as the striking of a note on a piano, lead to sudden increases in energy in various frequency bands. This can often be seen in the time-domain representation of the waveform as a local peak. A class of techniques for finding onsets involves computing (512) a spectral difference function (SDF). Given a spectrogram, the SDF is the first difference and is computed by summing the differences in amplitudes for each frequency bin at adjacent time-steps. For example:

$$SDF[i]=(\Sigma(B[i]-B[i-1])^{0.25})^4$$

Figure 5:
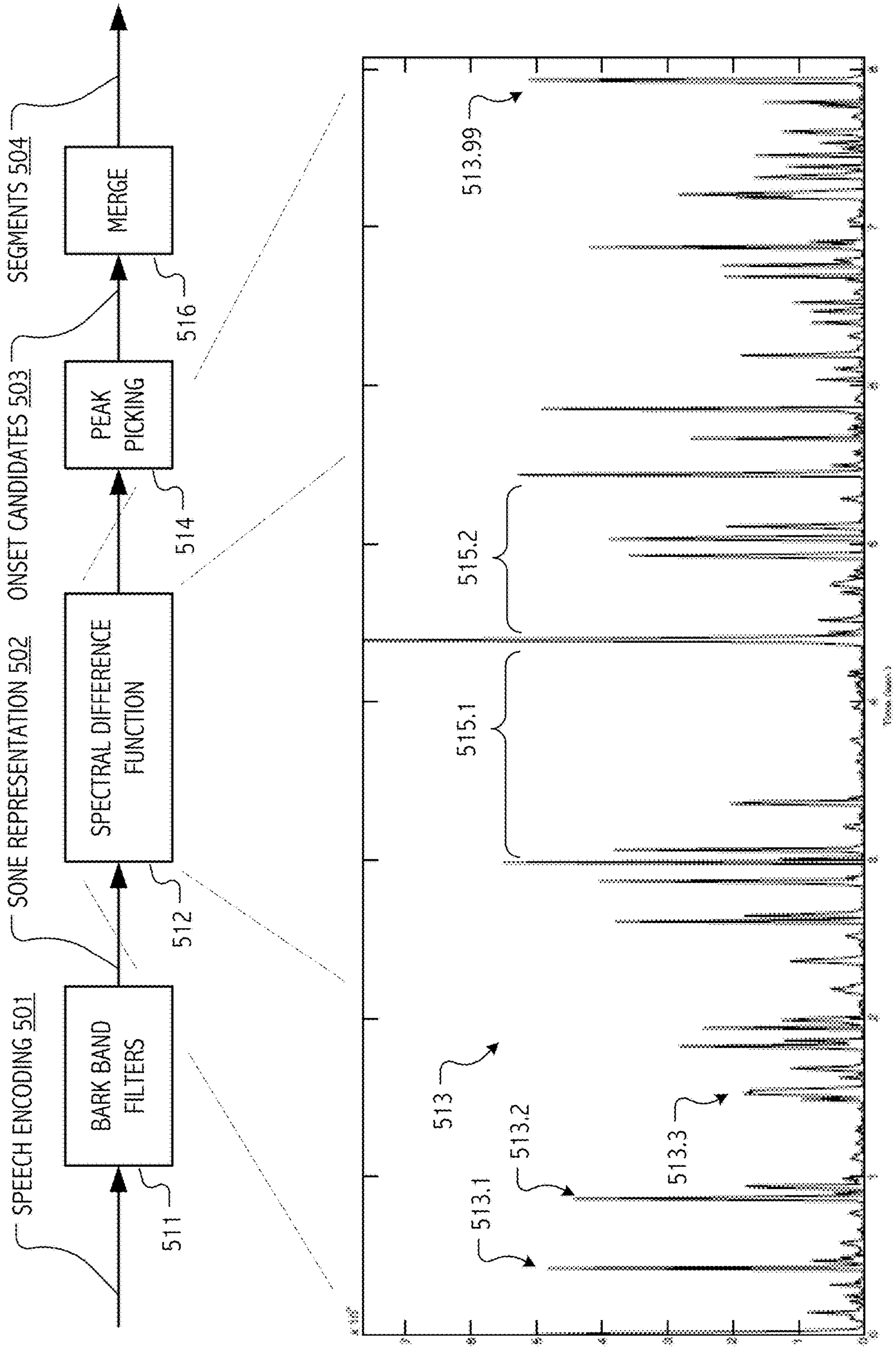
FIG. 5 illustrates, by way of a flowchart and a graphical illustration of peaks in a signal resulting from application of a spectral difference function, a sequence of steps in an illustrative method whereby an audio signal is segmented in accordance with some embodiments of the present invention(s).

Here we apply a similar procedure to the sone representation, yielding a type of SDF 513. The illustrated SDF 513 is a one-dimensional function, with peaks indicating likely onset candidates. FIG. 5 depicts an exemplary SDF computation 512 from an audio signal encoding derived from sampled vocals together with signal processing steps that precede and follow SDF computation 512 in an exemplary audio processing pipeline.

We next define onset candidates 503 to be the temporal location of local maxima (or peaks 513.1, 513.2, 513.3 . . . 513.99) that may be picked from the SDF (513). These locations indicate the possible times of the onsets. We additionally return a measure of onset strength that is determined by subtracting the level of the SDF curve at the local maximum from the median of the function over a small window centered at the maximum. Onsets that have an onset strength below a threshold value are typically discarded. Peak picking 514 produces a series of above-threshold-strength onset candidates 503.

We define a segment (e.g., segment 515.1) to be a chunk of audio between two adjacent onsets. In some cases, the onset detection algorithm described above can lead to many false positives leading to very small segments (e.g. much smaller than the duration of a typical word). To reduce the number of such segments, certain segments (see e.g., segment 515.2) are merged (515.2)) using an agglomeration algorithm. First, we determine whether there are segments that are shorter than a threshold value (here we start at 0.372 seconds threshold). If so, they are merged with a segment that temporally precedes or follows. In some cases, the direction of the merge is determined based on the strength of the neighboring onsets.

The result is segments that are based on a strong onset candidates and agglomeration of short neighboring segments to produce the segments (504) that define a segmented version of the speech encoding (501) that are used in subsequent steps. In the case of speech-to-song embodiments (see FIG. 6), subsequent steps may include segment mapping to construct phrase candidates and rhythmic alignment of phrase candidates to a pattern or rhythmic skeleton for a target song. In the case of speech-to-rap embodiments (see FIG. 9), subsequent steps may include alignment of segment delimiting onsets to a grid or rhythmic skeleton for a target song and stretching/compressing of particular aligned segments to fill to corresponding portions of the grid or rhythmic skeleton.

Phrase Construction for Speech-to-Song Embodiments

Figure 6:
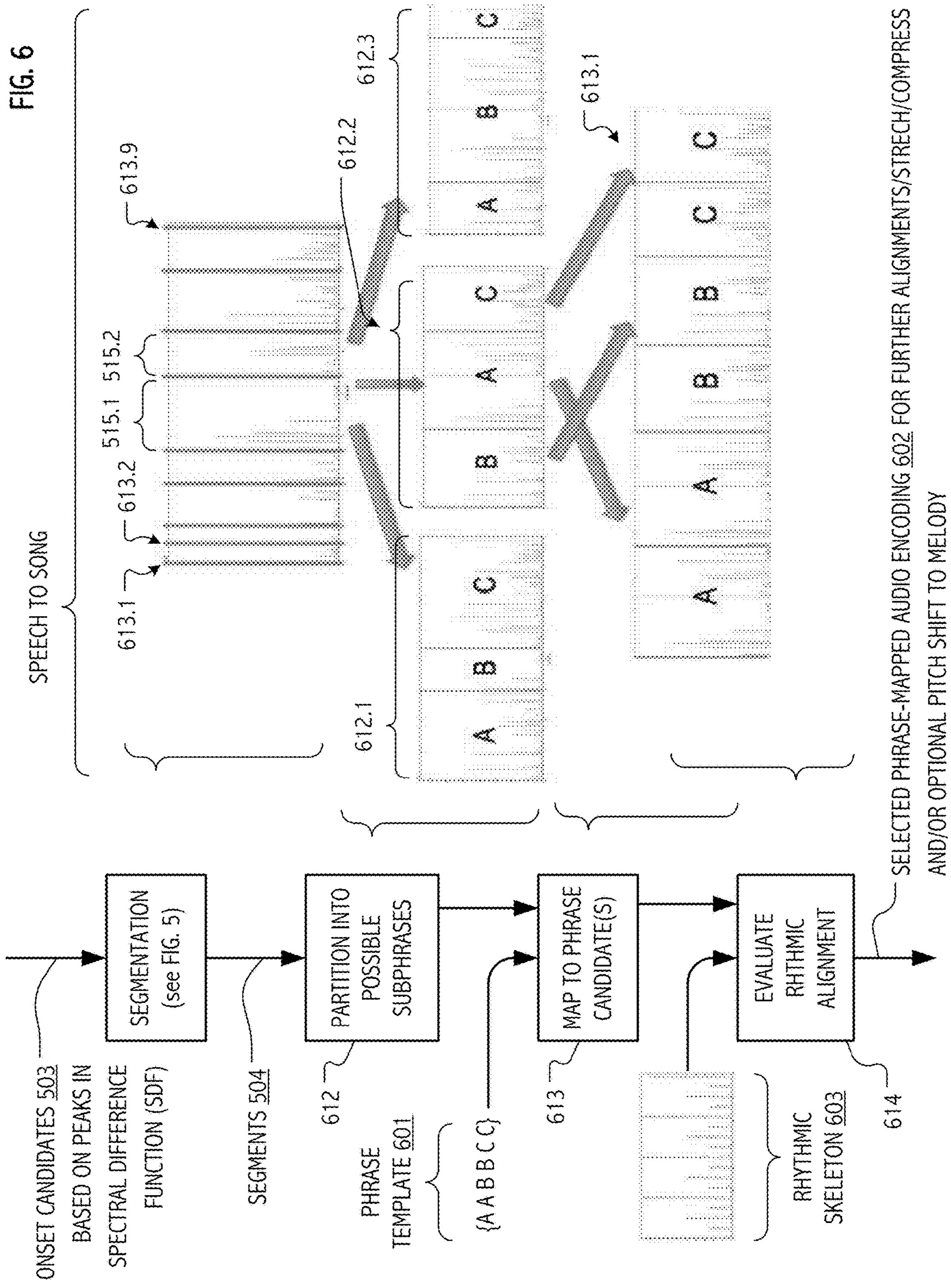
FIG. 6 illustrates, by way of a flowchart and a graphical illustration of partitions and sub-phrase mappings to a template, a sequence of steps in an illustrative method whereby a segmented audio signal is mapped to a phrase template and resulting phrase candidates are evaluated for rhythmic alignment therewith in accordance with some speech-to-song targeted embodiments of the present invention(s).

FIG. 6 illustrates, in further detail, phrase construction aspects of a larger computational flow (e.g., as summarized in FIG. 4 through functional or computational blocks such as previously illustrated and described relative to an application executing on a compute platform, recall FIG. 3). The illustration of FIG. 6 pertains to certain illustrative speech-to-song embodiments.

One goal of the previously described phrase construction step is to create phrases by combining segments (e.g., segments 504 such as may be generated in accord with techniques illustrated and described above relative to FIG. 5), possibly with repetitions, to form larger phrases. The process is guided by what we term phrase templates. A phrase template encodes a symbology that indicates the phrase structure, and follows a typical method for representing musical structure. For example, the phrase template {A A B B C C} indicates that the overall phrase consists of three sub-phrases, with each sub-phrase repeated twice. The goal of phrase construction algorithms described herein is to map segments to sub-phrases. After computing (612) one or more candidate sub-phrase partitionings of the captured speech audio signal based on onset candidates 503 and segments 504, possible sub-phrase partionings (e.g., partionings 612.1, 612.2 . . . 612.3) are mapped (613) to structure of phrase template 601 for the target song. Based on the mapping of sub-phrases (or indeed candidate sub-phrases) to a particular phrase template, a phrase candidate 613.1 is produced. FIG. 6 illustrates this process diagrammatically and in connection with subsequence of an illustrative process flow. In general, multiple phrase candidates may be prepared and evaluated to select a particular phrase-mapped audio encoding for further processing. In some embodiments, the quality of the resulting phrase mapping (or mappings) is (are) evaluated (614) based on the degree of rhythmic alignment with the underlying meter of the song (or other rhythmic target), as detailed elsewhere herein.

In some implementations of the techniques, it is useful to require the number of segments to be greater than the number of sub-phrases. Mapping of segments to sub-phrases can be framed as a partitioning problem. Let m be the number of sub-phrases in the target phrase. Then we require m−1 dividers in order to divide the vocal utterance into the correct number of phrases. In our process, we allow partitions only at onset locations. For example, in FIG. 6, we show a vocal utterance with detected onsets (613.1, 613.2 . . . 613.9) and evaluated in connection with target phrase structure encoded by phrase template 601 {A A B B C C}. Adjacent onsets are combined, as shown in FIG. 6, in order to generate the three sub-phrases A, B, and C. The set of all possible partitions with m parts and n onsets is $$\binom{n}{m-1}.$$

One of the computed partitions, namely sub-phrase partitioning 613.2, forms the basis of a particular phrase candidate 613.1 selected based on phrase template 601.

Note that some embodiments, a user may select and reselect from a library of phrase templates for differing target songs, performances, artists, styles etc. In some embodiments, phrase templates may be transacted, made available or demand supplied (or computed) in accordance with a part of an in-app-purchase revenue model or may be earned, published or exchanged as part of a gaming, teaching and/or social-type user interaction supported.

Because the number of possible phrases increases combinatorially with the number of segments, in some practical implementations, we restrict the total segments to a maximum of 20. Of course, more generally and for any given application, search space may be increased or decreased in accord with processing resources and storage available. If the number of segments is greater than this maximum after the first pass of the onset detection algorithm, the process is repeated using a higher minimum duration for agglomerating the segments. For example, if the original minimum segment length was 0.372 seconds, this might be increased to 0.5 seconds, leading to fewer segments. The process of increasing the minimum threshold will continue until the number of target segments is less than the desired amount. On the other hand, if the number of segments is less than the number of sub-phrases, then it will generally not be possible to map segments to sub-phrases without mapping the same segment to more than one sub-phrase. To remedy this, the onset detection algorithm is reevaluated in some embodiments using a lower segment length threshold, which typically results in fewer onsets agglomerated into a larger number of segments. Accordingly, in some embodiments, we continue to reduce the length threshold value until the number of segments exceeds the maximum number of sub-phrases present in any of the phrase templates. We have a minimum sub-phrase length we have to meet, and this is lowered if necessary to allow partitions with shorter segments.

Based on the description herein, persons of ordinary skill in the art will recognize numerous opportunities for feeding back information from later stages of a computational process to earlier stages. Descriptive focus herein on the forward direction of process flows is for ease and continuity of description and is not intended to be limiting.

Rhythmic Alignment

Each possible partition described above represents a candidate phrase for the currently considered phrase template. To summarize, we exclusively map one or more segments to a sub-phrase. The total phrase is then created by assembling the sub-phrases according to the phrase template. In the next stage, we wish to find the candidate phrase that can be most closely aligned to the rhythmic structure of the backing track. By this we mean we would like the phrase to sound as if it is on the beat. This can often be achieved by making sure accents in the speech tend to align with beats, or other metrically important positions.

To provide this rhythmic alignment, we introduce a rhythmic skeleton (RS) 603 as illustrated in FIG. 6, which gives the underlying accent pattern for a particular backing track. In some cases or embodiments, rhythmic skeleton 603 can include a set of unit impulses at the locations of the beats in the backing track. In general, such a rhythmic skeleton may be precomputed and downloaded for, or in conjunction with, a given backing track or computed on demand. If the tempo is known, it is generally straightforward to construct such an impulse train. However, in some tracks it may be desirable to add additional rhythmic information, such as the fact that the first and third beats of a measure are more accented than the second and fourth beats. This can be done by scaling the impulses so that their height represents the relative strength of each beat. In general, an arbitrarily complex rhythmic skeleton can be used. The impulse train, which consists of a series of equally spaced delta functions is then convolved with a small Hann (e.g. five-point) window to generate a continuous curve:

$$RS[n] = \sum_{m=0}^{N-1} \omega[n] * \delta[n-m], \text{ where } \omega(n) = 0.5\left(1 - \cos\frac{2\pi n}{N-1}\right)$$

We measure the degree of rhythmic alignment (RA), between the rhythmic skeleton and the phrase, by taking the cross correlation of the RS with the spectral difference function (SDF), calculated using the sone representation. Recall that the SDF represents sudden changes in signal that correspond to onsets. In the music information retrieval literature we refer to this continuous curve that underlies onset detection algorithms as a detection function. The detection function is an effective method for representing the accent or mid-level event structure of the audio signal. The cross correlation function measures the degree of correspondence for various lags, by performing a point-wise multiplication between the RS and the SDF and summing, assuming different starting positions within the SDF buffer. Thus for each lag the cross correlation returns a score. The peak of the cross correlation function indicates the lag with the greatest alignment. The height of the peak is taken as a score of this fit, and its location gives the lag in seconds.

The alignment score A is then given by $$\max A[n] = \max \sum_{m=0}^{N-1} RS[n-m] * SDF[m]$$

This process is repeated for all phrases and the phrase with the highest score is used. The lag is used to rotate the phrase so that it starts from that point. This is done in a circular manner. It is worth noting that the best fit can be found across phrases generated by all phrase templates or just a given phrase template. We choose to optimize across all phrase templates, giving a better rhythmic fit and naturally introducing variety to the phrase structure.

When a partition mapping requires a sub-phrase to repeat (as in a rhythmic pattern such as specified by the phrase template {A A B C}), the repeated sub-phrase was found to sound more rhythmic when the repetition was padded to occur on the next beat. Likewise, the entire resultant partitioned phrase is padded to the length of a measure before repeating with the backing track.

Accordingly, at the end of the phrase construction (613) and rhythmic alignment (614) procedure, we have a complete phrase constructed from segments of the original vocal utterance that has been aligned to the backing track. If the backing track or vocal input is changed, the process is re-run. This concludes the first part of an illustrative "songification" process. A second part, which we now describe, transforms the speech into a melody.

To further synchronize the onsets of the voice with the onsets of the notes in the desired melody line, we use a procedure to stretch voice segments to match the length of the melody. For each note in the melody, the segment onset (calculated by our segmentation procedure described above) that occurs nearest in time to the note onset while still within a given time window is mapped to this note onset. The notes are iterated through (typically exhaustively and typically in a generally random order to remove bias and to introduce variability in the stretching from run to run) until all notes with a possible matching segment are mapped. The note-to-segment map then is given to the sequencer which then stretches each segment the appropriate amount such that it fills the note to which it is mapped. Since each segment is mapped to a note that is nearby, the cumulative stretch factor over the entire utterance should be more or less unity, however if a global stretch amount is desired (e.g. slow down the result utterance by 2), this is achieved by mapping the segments to a sped-up version of the melody: the output stretch amounts are then scaled to match the original speed of the melody, resulting in an overall tendency to stretch by the inverse of the speed factor.

Although the alignment and note-to-segment stretching processes synchronize the onsets of the voice with the notes of the melody, the musical structure of the backing track can be further emphasized by stretching the syllables to fill the length of the notes. To achieve this without losing intelligibility, we use dynamic time stretching to stretch the vowel sounds in the speech, while leaving the consonants as they are. Since consonant sounds are usually characterized by their high frequency content, we used spectral roll-off up to 95% of the total energy as the distinguishing feature between vowels and consonants. Spectral roll-off is defined as follows. If we let $|X[k]|$ be the magnitude of the k-th Fourier coefficient, then the roll-off for a threshold of 95% is defined to be $k\_roll = \Sigma_{k=0}^{k\_roll} X[k] < 0.95 * \Sigma_{k=0}^{N-1} |X[k]|$, where N is the length of the FFT. In general, a greater k_roll Fourier bin index is consistent with increased high-frequency energy and is an indication of noise or an unvoiced consonant. Likewise, a lower k_roll Fourier bin index tends to indicate a voiced sound (e.g., a vowel) suitable for time stretching or compression.

The spectral roll-off of the voice segments are calculated for each analysis frame of 1024 samples and 50% overlap. Along with this the melodic density of the associated melody (MIDI symbols) is calculated over a moving window, normalized across the entire melody and then interpolated to give a smooth curve. The dot product of the spectral roll-off and the normalized melodic density provides a matrix, which is then treated as the input to the standard dynamic programming problem of finding the path through the matrix with the minimum associated cost. Each step in the matrix is associated with a corresponding cost that can be tweaked to adjust the path taken through the matrix. This procedure yields the amount of stretching required for each frame in the segment to fill the corresponding notes in the melody.

Speech to Melody Transform

Although fundamental frequency, or pitch, of speech varies continuously, it is does not generally sound like a musical melody. The variations are typically too small, too rapid, or too infrequent to sound like a musical melody. Pitch variations occur for a variety of reasons including the mechanics of voice production, the emotional state of the speaker, to indicate phrase endings or questions, and an inherent part of tone languages.

In some embodiments, the audio encoding of speech segments (aligned/stretched/compressed to a rhythmic skeleton or grid as described above) is pitch corrected in accord with a note sequence or melody score. As before, the note sequence or melody score may be precomputed and downloaded for, or in connection with, a backing track.

Figure 7:
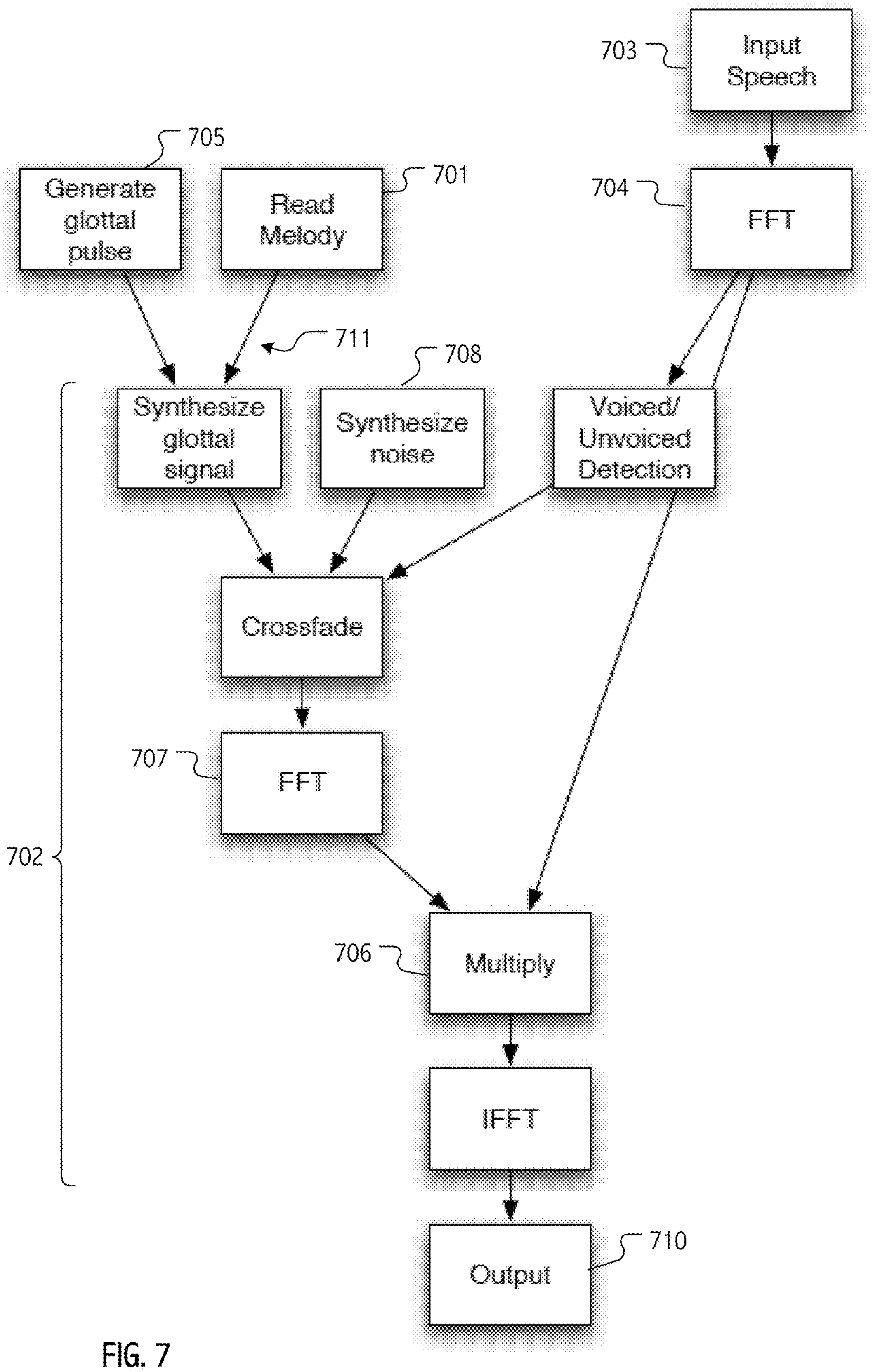
FIG. 7 graphically illustrates signal processing functional flows in a speech-to-song (songification) application in accordance with some embodiments of the present invention.

For some embodiments, a desirable attribute of an implemented speech-to-melody (S2M) transformation is that the speech should remain intelligible while sounding clearly like a musical melody. Although persons of ordinary skill in the art will appreciate a variety of possible techniques that may be employed, our approach is based on cross-synthesis of a glottal pulse, which emulates the periodic excitation of the voice, with the speaker's voice. This leads to a clearly pitched signal that retains the timbral characteristics of the voice, allowing the speech content to be clearly understood in a wide variety of situations. FIG. 7 shows a block diagram of signal processing flows in some embodiments in which a melody score 701 (e.g., that read from local storage, downloaded or demand-supplied for, or in connection with, a backing track, etc.) is used as an input to cross synthesis (702) of a glottal pulse. Source excitation of the cross synthesis is the glottal signal (from 707), while target spectrum is provided by FFT 704 of the input vocals.

Figure 8:
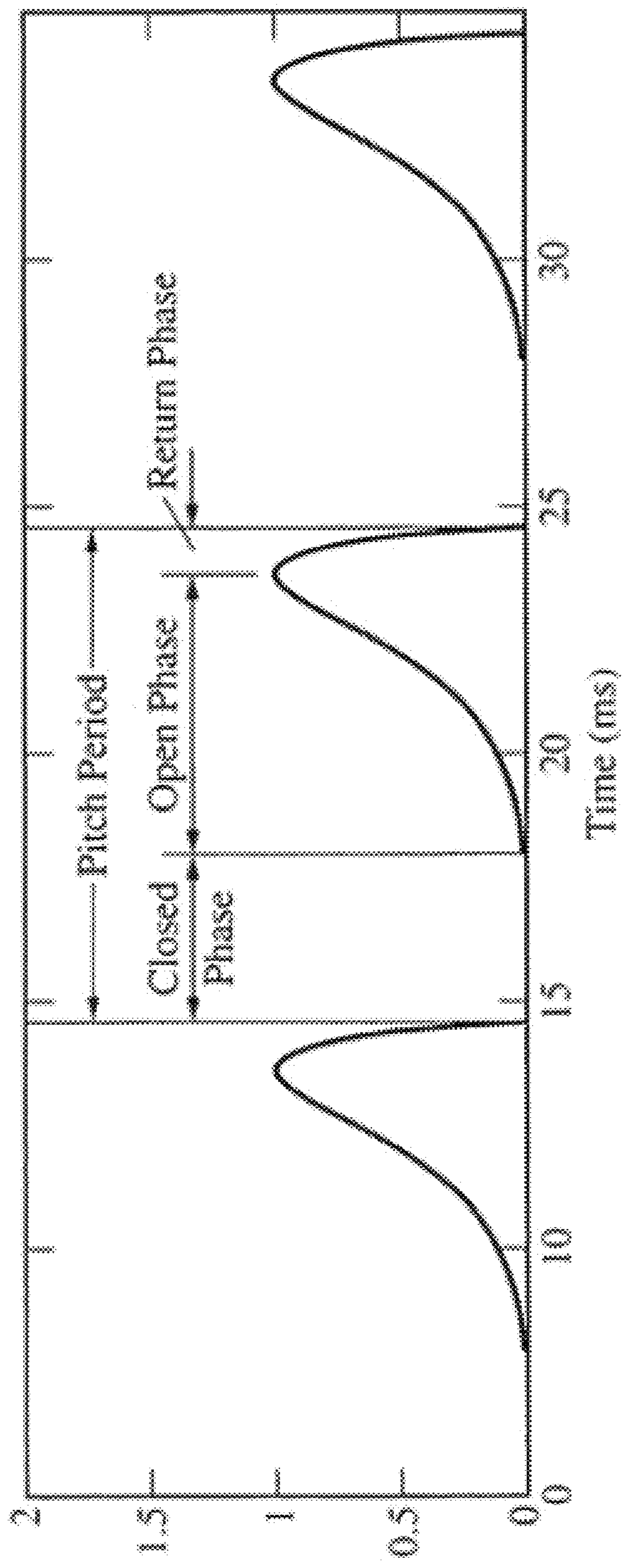
FIG. 8 graphically illustrates a glottal pulse model that may be employed in some embodiments in accordance with the present invention for synthesis of a pitch shifted version of an audio signal that has been aligned, stretched and/or compressed in correspondence with a rhythmic skeleton or grid.

The input speech 703 is sampled at 44.1 kHz and its spectrogram is calculated (704) using a 1024 sample Hann window (23 ms) overlapped by 75 samples. The glottal pulse (705) was based on the Rosenberg model which is shown in FIG. 8. It is created according to the following equation and consists of three regions that correspond to pre-onset ($0-t_0$), onset-to-peak ($t_0-t_f$), and peak-to-end ($t_f-T_p$). $T_p$ is the pitch period of the pulse. This is summarized by the following equation:

$$g(t) = \begin{cases} 0 \text{ for } 0 \le t \le t_0 \\ A_g \sin\left(\frac{\pi}{2}\frac{t-t_0}{t_f-t_0}\right) \\ A_g \sin\left(\frac{\pi}{2}\frac{t-t_f}{T_p-t_f}\right) \end{cases}$$

Parameters of the Rosenberg glottal pulse include the relative open duration ($t_f-t_0/T_p$) and the relative closed duration ($(T_p-t_f)/T_p$). By varying these ratios the timbral characteristics can be varied. In addition to this, the basic shape was modified to give the pulse a more natural quality. In particular, the mathematically defined shape was traced by hand (i.e. using a mouse with a paint program), leading to slight irregularities. The "dirtied waveform was then low-passed filtered using a 20-point finite impulse response (FIR) filter to remove sudden discontinuities introduced by the quantization of the mouse coordinates.

The pitch of the above glottal pulse is given by $T_p$. In our case, we wished to be able to flexibly use the same glottal pulse shape for different pitches, and to be able to control this continuously. This was accomplished by resampling the glottal pulse according to the desired pitch, thus changing the amount by which to hop in the waveform. Linear interpolation was used to determine the value of the glottal pulse at each hop.

The spectrogram of the glottal waveform was taken using a 1024 sample Hann window overlapped by 75%. The cross synthesis (702) between the periodic glottal pulse waveform and the speech was accomplished by multiplying (706) the magnitude spectrum (707) of each frame of the speech by the complex spectrum of the glottal pulse, effectively rescaling the magnitude of the complex amplitudes according to the glottal pulse spectrum. In some cases or embodiments, rather than using the magnitude spectrum directly, the energy in each bark band is used after pre-emphasizing (spectral whitening) the spectrum. In this way, the harmonic structure of the glottal pulse spectrum is undisturbed while the formant structure of the speech is imprinted upon it. We have found this to be an effective technique for the speech to music transform.

One issue that arises with the above approach is that un-voiced sounds such as some consonant phonemes, which are inherently noisy, are not modeled well by the above approach. This can lead to a "ringing sound" when they are present in the speech and to a loss of percussive quality. To better preserve these sections, we introduce a controlled amount of high passed white noise (708). Unvoiced sounds tend to have a broadband spectrum, and spectral roll-off is again used as an indicative audio feature. Specifically, frames that are not characterized by significant roll-off of high frequency content are candidates for a somewhat compensatory addition of high passed white noise. The amount of noise introduced is controlled by the spectral roll-off of the frame, such that unvoiced sounds that have a broadband spectrum, but which are otherwise not well modeled using the glottal pulse techniques described above, are mixed with an amount of high passed white noise that is controlled by this indicative audio feature. We have found that this leads to output which is much more intelligible and natural.

Song Construction, Generally

Some implementations of the speech to music songification process described above employ a pitch control signal which determines the pitch of the glottal pulse. As will be appreciated, the control signal can be generated in any number of ways. For example, it might be generated randomly, or according to statistical model. In some cases or embodiments, a pitch control signal (e.g., 711) is based on a melody (701) that has been composed using symbolic notation, or sung. In the former case, a symbolic notation, such as MIDI is processed using a Python script to generate an audio rate control signal consisting of a vector of target pitch values. In the case of a sung melody, a pitch detection algorithm can be used to generate the control signal. Depending on the granularity of the pitch estimate, linear interpolation is used to generate the audio rate control signal.

A further step in creating a song is mixing the aligned and synthesis transformed speech (output 710) with a backing track, which is in the form of a digital audio file. It should be noted that as described above, it is not known in advance how long the final melody will be. The rhythmic alignment step may choose a short or long pattern. To account for this, the backing track is typically composed so that it can be seamlessly looped to accommodate longer patterns. If the final melody is shorter than the loop, then no action is taken and there will be a portion of song with no vocals.

Variations for Output Consistent with Other Genres

We now describe further methods that are more suitable for transforming speech into "rap", that is, speech that has been rhythmically aligned to a beat. We call this procedure "AutoRap" and persons of ordinary skill in the art will appreciate a broad range of implementations based on the description herein. In particular, aspects of a larger computational flow (e.g., as summarized in FIG. 4 through functional or computational blocks such as previously illustrated and described relative to an application executing on a compute platform, recall FIG. 3) remain applicable. However, certain adaptations to previously described, segmentation and alignment techniques are appropriate for speech-to-rap embodiments. The illustration of FIG. 9 pertains to certain illustrative speech-to-rap embodiments.

As before, segmentation (here segmentation 911) employs a detection function is calculated using the spectral difference function based on a bark band representation. However, here we emphasize a sub-band from approximately 700 Hz to 1500 Hz, when computing the detection function. It was found that a band-limited or emphasized DF more closely corresponds to the syllable nuclei, which perceptually are points of stress in the speech.

More specifically, it has been found that while a mid-band limitation provides good detection performance, even better detection performance can be achieved in some cases by weighting the mid-bands but still considering spectrum outside the emphasized mid-band. This is because percussive onsets, which are characterized by broadband features, are captured in addition to vowel onsets, which are primarily detected using mid-bands. In some embodiments, a desirable weighting is based on taking the log of the power in each bark band and multiplying by 10, for the mid-bands, while not applying the log or rescaling to other bands.

When the spectral difference is computed, this approach tends to give greater weight to the mid-bands since the range of values is greater. However, because the L-norm is used with a value of 0.25 when computing the distance in the spectral distance function, small changes that occur across many bands will also register as a large change, such as if a difference of a greater magnitude had been observed in one, or a few, bands. If a Euclidean distance had been used, this effect would not have been observed. Of course, other mid-band emphasis techniques may be utilized in other embodiments.

Aside from the mid-band emphasis just described, detection function computation is analogous to the spectral difference (SDF) techniques described above for speech-to-song implementations (recall FIGS. 5 and 6, and accompanying description). As before, local peak picking is performed on the SDF using a scaled median threshold. The scale factor controls how much the peak has to exceed the local median to be considered a peak. After peak peaking, the SDF is passed, as before, to the agglomeration function. Turning again to FIG. 9, but again as noted above, agglomeration halts when no segment is less than the minimum segment length, leaving the original vocal utterance divided into contiguous segments (here 904).

Next, a rhythmic pattern (e.g., rhythmic skeleton or grid 903) is defined, generated or retrieved. Note that some embodiments, a user may select and reselect from a library of rhythmic skeletons for differing target raps, performances, artists, styles etc. As with phrase templates, rhythmic skeletons or grids may be transacted, made available or demand supplied (or computed) in accordance with a part of an in-app-purchase revenue model or may be earned, published or exchanged as part of a gaming, teaching and/or social-type user interaction supported.

In some embodiments, a rhythmic pattern is represented as a series of impulses at particular time locations. For example, this might simply be an equally spaced grid of impulses, where the inter-pulse width is related to the tempo of the current song. If the song has a tempo of 120 BPM, and thus an inter-beat period of 0.5 s, then the inter-pulse would typically be an integer fraction of this (e.g. 0.5, 0.25, etc.). In musical terms, this is equivalent to an impulse every quarter note, or every eighth note, etc. More complex patterns can also be defined. For example, we might specify a repeating pattern of two quarter notes followed by four eighth notes, making a four beat pattern. At a tempo of 120 BPM the pulses would be at the following time locations (in seconds): 0, 0.5, 1.5, 1.75, 2.0, 2.25, 3.0, 3.5, 4.0, 4.25, 4.5, 4.75.

Figure 9:
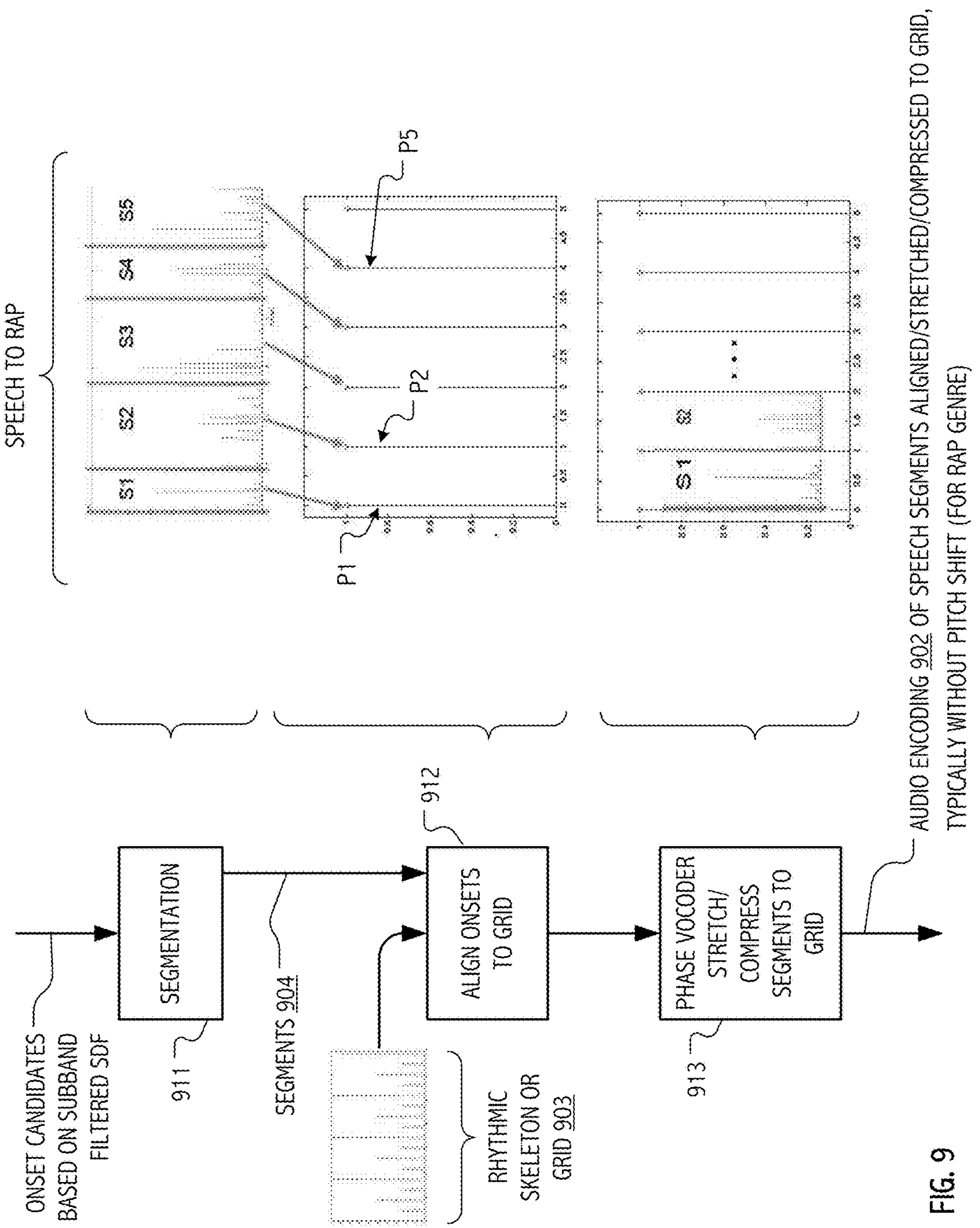
FIG. 9 illustrates, by way of a flowchart and a graphical illustration of segmentation and alignment, a sequence of steps in an illustrative method whereby onsets are aligned to a rhythmic skeleton or grid and corresponding segments of a segmented audio signal are stretched and/or compressed in accordance with some speech-to-rap targeted embodiments of the present invention(s).

After segmentation (911) and grid construction, alignment is (912) performed. FIG. 9 illustrates an alignment process that differs from the phrase template driven technique of FIG. 6, and which is instead adapted for speech-to-rap embodiments. Referring to FIG. 9, each segment is moved in sequential order to the corresponding rhythmic pulse. If we have segments S1, S2, S3 . . . S5 and pulses P1, P2, P3 . . . S5, then segment S1 is moved to the location of pulse P1, S2 to P2, and so on. In general, the length of the segment will not match the distance between consecutive pulses. There are two procedures that we use to deal with this:

(1) The segment is time stretched (if it is too short), or compressed (if it is too long) to fit the space between consecutive pulses. The process is illustrated graphically in FIG. 9. We describe below a technique for time-stretching and compressing which is based on use of a phase vocoder 913.

(2) If the segment is too short, it is padded with silence. The first procedure is used most often, but if the segment requires substantial stretching to fit, the latter procedure is sometimes used to prevent stretching artifacts.

Two additional strategies are employed to minimize excessive stretching or compression. First, rather than only starting the mapping from S1, we consider all mapping starting from every possible segment and wrapping around when the end is reached. Thus, if we start at S5 the mapping will be segment S5 to pulse P1, S6 to P2 etc. For each starting point, we measure the total amount of stretching/compression, which we call rhythmic distortion. In some embodiments, a rhythmic distortion score is computed as the reciprocal of stretch ratios less than one. This procedure is repeated for each rhythmic pattern. The rhythmic pattern (e.g., rhythmic skeleton or grid 903) and starting point which minimize the rhythmic distortion score are taken to be the best mapping and used for synthesis.

In some cases or embodiments, an alternate rhythmic distortion score, that we found often worked better, was computed by counting the number of outliers in the distribution of the speed scores. Specifically, the data were divided into deciles and the number of segments whose speed scores were in the bottom and top deciles were added to give the score. A higher score indicates more outliers and thus a greater degree of rhythmic distortion.

Second, phase vocoder 913 is used for stretching/compression at a variable rate. This is done in real-time, that is, without access to the entire source audio. Time stretch and compression necessarily result in input and output of different lengths—this is used to control the degree of stretching/compression. In some cases or embodiments, phase vocoder 913 operates with four times overlap, adding its output to an accumulating FIFO buffer. As output is requested, data is copied from this buffer. When the end of the valid portion of this buffer is reached, the core routine generates the next hop of data at the current time step. For each hop, new input data is retrieved by a callback, provided during initialization, which allows an external object to control the amount of time-stretching/compression by providing a certain number of audio samples. To calculate the output for one time step, two overlapping windows of length 1024 (nfft), offset by nfft/4, are compared, along with the complex output from the previous time step. To allow for this in a real-time context where the full input signal may not be available, phase vocoder 913 maintains a FIFO buffer of the input signal, of length 5/4 nfft; thus these two overlapping windows are available at any time step. The window with the most recent data is referred to as the "front" window; the other ("back") window is used to get delta phase.

First, the previous complex output is normalized by its magnitude, to get a vector of unit-magnitude complex numbers, representing the phase component. Then the FFT is taken of both front and back windows. The normalized previous output is multiplied by the complex conjugate of the back window, resulting in a complex vector with the magnitude of the back window, and phase equal to the difference between the back window and the previous output.

We attempt to preserve phase coherence between adjacent frequency bins by replacing each complex amplitude of a given frequency bin with the average over its immediate neighbors. If a clear sinusoid is present in one bin, with low-level noise in adjacent bins, then its magnitude will be greater than its neighbors and their phases will be replaced by that of the true sinusoid. We find that this significantly improves resynthesis quality.

The resulting vector is then normalized by its magnitude; a tiny offset is added before normalization to ensure that even zero-magnitude bins will normalize to unit magnitude. This vector is multiplied with the Fourier transform of the front window; the resulting vector has the magnitude of the front window, but the phase will be the phase of the previous output plus the difference between the front and back windows. If output is requested at the same rate that input is provided by the callback, then this would be equivalent to reconstruction if the phase coherence step were excluded.

Particular Deployments or Implementations

Figure 10:
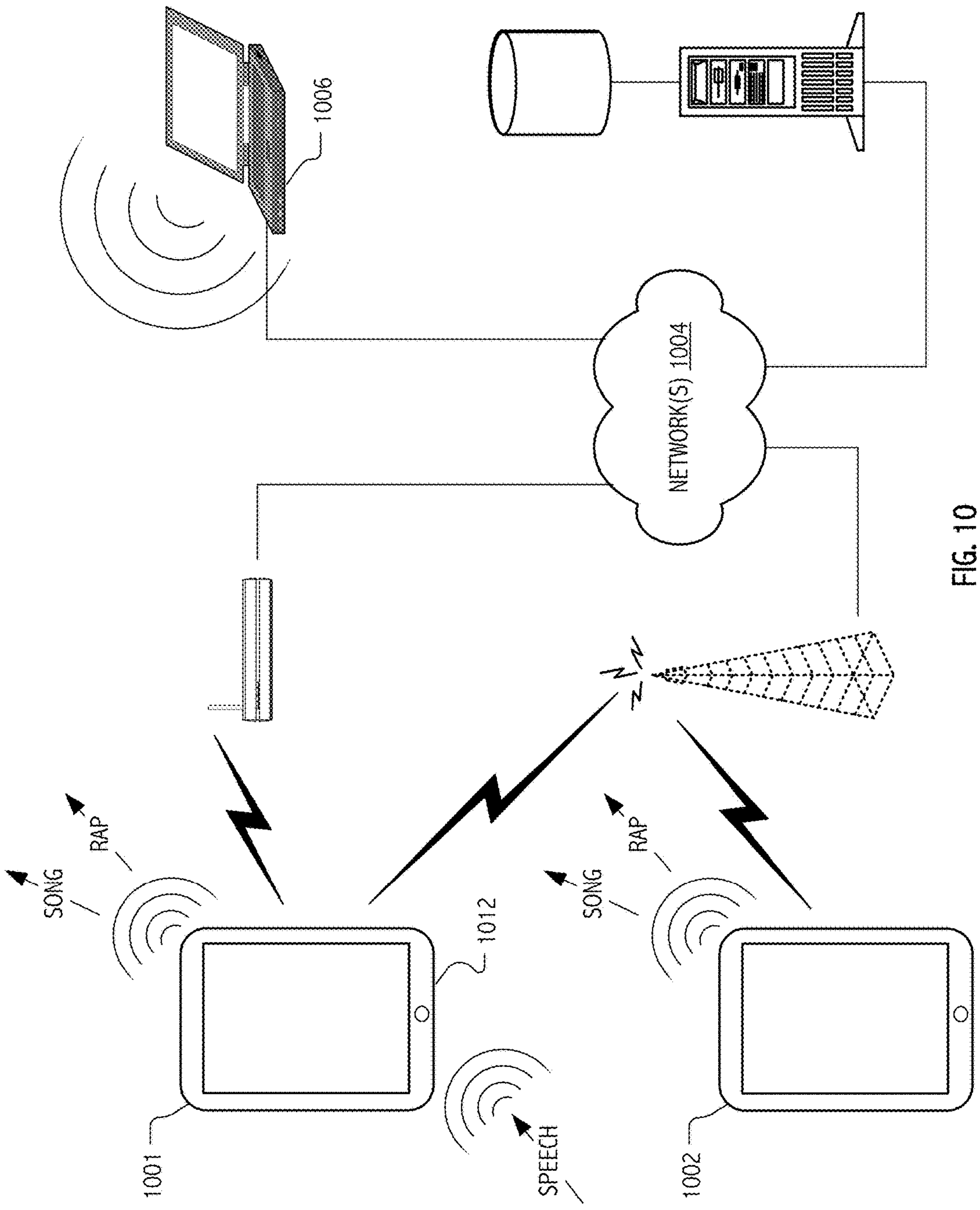
FIG. 10 illustrates a networked communication environment in which speech-to-music and/or speech-to-rap targeted implementations communicate with remote data stores or service platforms and/or with remote devices suitable for audible rendering of audio signals transformed in accordance with some embodiments of the present invention(s).

FIG. 10 illustrates a networked communication environment in which speech-to-music and/or speech-to-rap targeted implementations (e.g., applications embodying computational realizations of signal processing techniques described herein and executable on a handheld compute platform 1001) capture speech (e.g., via a microphone input 1012) and are in communication with remote data stores or service platforms (e.g., server/service 1005 or within a network cloud 1004) and/or with remote devices (e.g., handheld compute platform 1002 hosting an additional speech-to-music and/or speech-to-rap application instance and/or computer 1006), suitable for audible rendering of audio signals transformed in accordance with some embodiments of the present invention(s).

Figure 11:
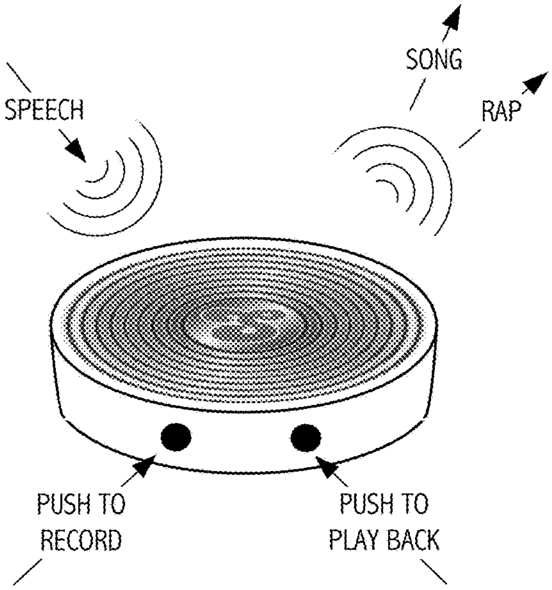
FIGS. 11 and 12 depict illustrative toy- or amusement-type devices in accordance with some embodiments of the present invention(s).
Figure 12:
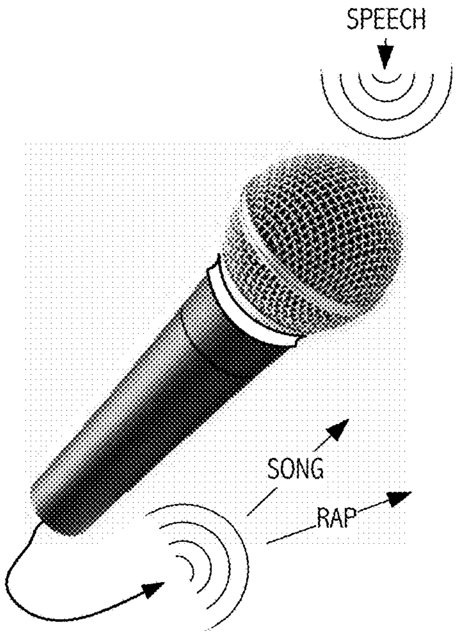
Figure 13:
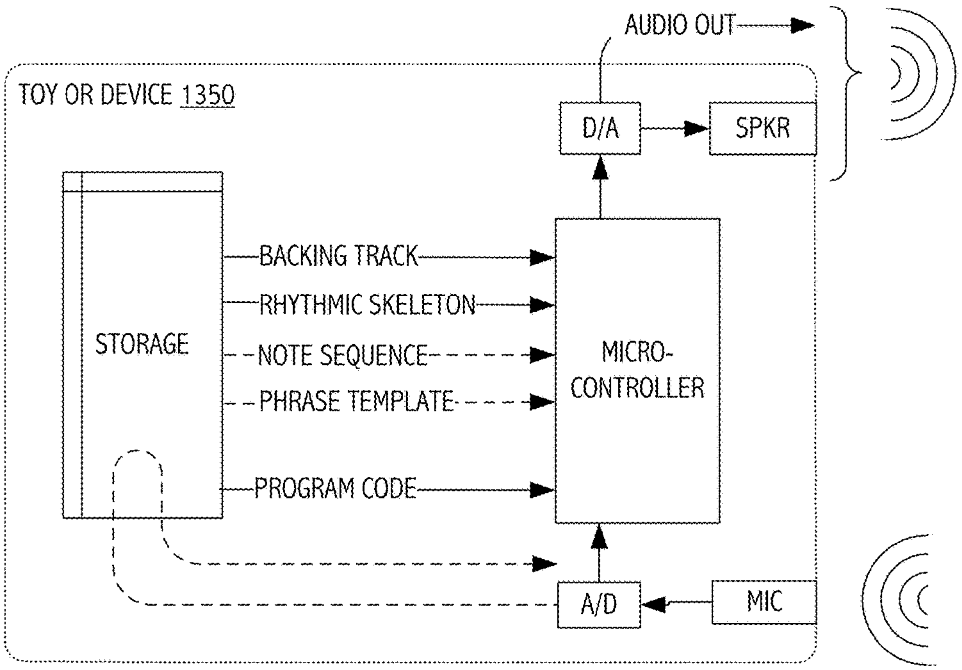
FIG. 13 is a functional block diagram of data and other flows suitable for device types illustrated in FIGS. 11 and 12 (e.g., for toy- or amusement-type device markets) in which automated transformation techniques described herein may be provided at low-cost in a purpose-built device having a microphone for vocal capture, a programmed microcontroller, digital-to-analog circuits (DAC), analog-to-digital converter (ADC) circuits and an optional integrated speaker or audio signal output.

Some embodiments in accordance with the present invention(s) may take the form of, and/or be provided as, purpose-built devices such as for the toy or amusement markets. FIGS. 11 and 12 depict example configurations for such purpose-built devices, and FIG. 13 illustrates a functional block diagram of data and other flows suitable for realization/use in internal electronics of a toy or device 1350 in which automated transformation techniques described herein. As compared to programmable handheld compute platforms, (e.g., iOS or Android device type embodiments), implementations of internal electronics for a toy or device 1350 may be provided at relatively low-cost in a purpose-built device having a microphone for vocal capture, a programmed microcontroller, digital-to-analog circuits (DAC), analog-to-digital converter (ADC) circuits and an optional integrated speaker or audio signal output.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while embodiments have been described in which vocal speech is captured and automatically transformed and aligned for mix with a backing track, it will be appreciated that automated transforms of captured vocals described herein may also be employed to provide expressive performances that are temporally aligned with a target rhythm or meter (such as may be characteristic of a poem, iambic cycle, limerick, etc.) and without musical accompaniment.

Furthermore, while certain illustrative signal processing techniques have been described in the context of certain illustrative applications, persons of ordinary skill in the art will recognize that it is straightforward to modify the described techniques to accommodate other suitable signal processing techniques and effects.

Some embodiments in accordance with the present invention(s) may take the form of, and/or be provided as, a computer program product encoded in a machine-readable medium as instruction sequences and other functional constructs of software tangibly embodied in non-transient media, which may in turn be executed in a computational system (such as a iPhone handheld, mobile device or portable computing device) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible, non-transient storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computational method for transforming an input audio encoding of speech into an output that is rhythmically consistent with a target song, the method comprising:

retrieving a computer readable encoding of a backing track for the target song;

performing beat detection for the backing track of the target song to produce a rhythmic skeleton;

segmenting an input audio encoding of speech into a plurality of segments, the segments corresponding to successive sequences of samples of the input audio encoding and delimited by onsets identified therein, wherein the segmenting includes agglomerating one or more adjacent onset candidate-delimited sub-portions of the input audio encoding into a segment in the plurality of segments, the agglomerating based, at least in part, on comparative strength of onset candidate-delimited sub-portions of the input audio encoding identified by applying a function to the input audio encoding, wherein each of the agglomerated one or more adjacent onset candidate-delimited sub-portions is shorter in duration than a minimum segment length;

temporally aligning successive, time-ordered ones of the segments with respective successive pulses of the rhythmic skeleton for the target song; and preparing a resultant audio encoding of the speech in correspondence with the temporally aligned segments of the input audio encoding.

2. The computational method of claim 1, wherein the retrieving is performed responsive to a selection of the target song by a user.

3. The computational method of claim 1, further comprising:

using a phase vocoder, temporally stretching at least some of the temporally aligned segments and temporally compressing at least some other ones of the temporally aligned segments, the temporal stretching and compressing substantially filling available temporal space between respective ones of the successive pulses of the rhythmic skeleton.

4. The computational method of claim 3, wherein the temporal stretching and compressing is performed substantially without pitch shifting the temporally aligned segments.

5. The computational method of claim 3, wherein the temporal stretching and compressing is performed only on vowel sounds of at least some of the temporally aligned segments.

6. The computational method of claim 4, wherein the temporal stretching and compressing are performed in real-time at rates that vary for respective of the temporally aligned segments in accord with respective ratios of segment length to temporal space to be filled between successive pulses of the rhythmic skeleton.

7. The computational method of claim 1, further comprising from a microphone input of a portable handheld device, capturing speech voiced by a user thereof as the input audio encoding.

8. The computational method of claim 1, further comprising pitch correcting at least some of the temporally aligned segments in accord with a precomputed note sequence or melody score corresponding to the backing track.

9. The computational method of claim 1, further comprising:

mixing the resultant audio encoding with an audio encoding of a backing track for the target song; and audibly rendering the mixed audio.

10. The computational method of claim 1, further comprising:

for at least some of the temporally aligned segments of the speech encoding, padding with silence to substantially fill available temporal space between respective ones of the successive pulses of the rhythmic skeleton.

11. The computational method of claim 1, performed on a portable computing device selected from the group of:

a computing pad;

a personal digital assistant or book reader; and a mobile phone or media player.

12. A computer program product encoded in non-transitory media and including instructions executable on a computational system to transform an input audio encoding of speech into an output that is rhythmically consistent with a target song, the computer program product encoding and comprising:

instructions executable to retrieve a computer readable encoding of a backing track for the target song;

instructions executable to perform beat detection for the backing track of the target song to produce a rhythmic skeleton;

instructions executable to segment an input audio encoding of speech into a plurality of segments, the segments corresponding to successive sequences of samples of the input audio encoding and delimited by onsets identified therein, wherein the instructions executable to segment further include instructions executable to agglomerate one or more adjacent onset candidate-delimited sub-portions of the input audio encoding into a segment in the plurality of segments, the agglomerating based, at least in part, on comparative strength of onset candidate-delimited sub-portions of the input audio encoding identified by applying a function to the input audio encoding, wherein each of the agglomerated one or more adjacent onset candidate-delimited sub-portions is shorter in duration than a minimum segment length;

instructions executable to temporally align successive, time-ordered ones of the segments with respective successive pulses of the rhythmic skeleton for the target song; and instructions executable to prepare a resultant audio encoding of the speech in correspondence with the temporally aligned segments of the input audio encoding.

13. The computer program product of claim 12, wherein the computer program product is executable on a processor of a portable computing device.

14. The computer program product of claim 12, wherein the instructions executable to retrieve a computer readable encoding of the backing track for the target song include instructions executable to obtain, from a remote store and via a communication interface, the backing track.

15. The computer program product of claim 12, wherein the computer program product further encodes and comprises:

instructions executable to temporally stretch at least some of the temporally aligned segments and temporally compress at least some other ones of the temporally aligned segments, the temporal stretching and compressing performed using a phase vocoder and substantially filling available temporal space between respective ones of the successive pulses of the rhythmic skeleton.

16. The computer program product of claim 15, wherein the temporal stretching and compressing is performed only on vowel sounds of at least some of the temporally aligned segments.

17. An apparatus comprising:

a portable computing device; and machine readable code embodied in a non-transitory medium and executable on the portable computing device to retrieve a computer readable encoding of a backing track for a target song;

the machine readable code further executable to perform beat detection for the backing track of the target song to produce a rhythmic skeleton;

the machine readable code further executable to segment an input audio encoding of speech into a plurality of segments, the segments corresponding to successive sequences of samples of the input audio encoding and delimited by onsets identified therein, wherein the machine readable code further executable to segment includes machine readable code further executable to agglomerate one or more adjacent onset candidate-delimited sub-portions of the input audio encoding into a segment in the plurality of segments, the agglomerating based, at least in part, on comparative strength of onset candidate-delimited sub-portions of the input audio encoding identified by applying a function to the input audio encoding, the agglomerating further based at least in part on a minimum segment length;

the machine readable code further executable to temporally align successive, time-ordered ones of the segments with respective successive pulses of the rhythmic skeleton for the target song; and the machine readable code further executable to prepare a resultant audio encoding of the speech in correspondence with the temporally aligned segments of the input audio encoding.

18. The apparatus of claim 17, embodied as one or more of a computing pad, a handheld mobile device, a mobile phone, a personal digital assistant, a smart phone, a media player and a book reader.

19. The apparatus of claim 17, wherein the machine readable code is further executable to temporally stretch at least some of the temporally aligned segments and temporally compress at least some other ones of the temporally aligned segments, the temporal stretching and compressing performed using a phase vocoder and substantially filling available temporal space between respective ones of the successive pulses of the rhythmic skeleton.

20. The apparatus of claim 19, wherein the temporal stretching and compressing is performed only on vowel sounds of at least some of the temporally aligned segments.

* * * * *